Aug. 28, 1945.  A. J. MATTER  2,383,667
FLUID SEAL
Filed July 27, 1942
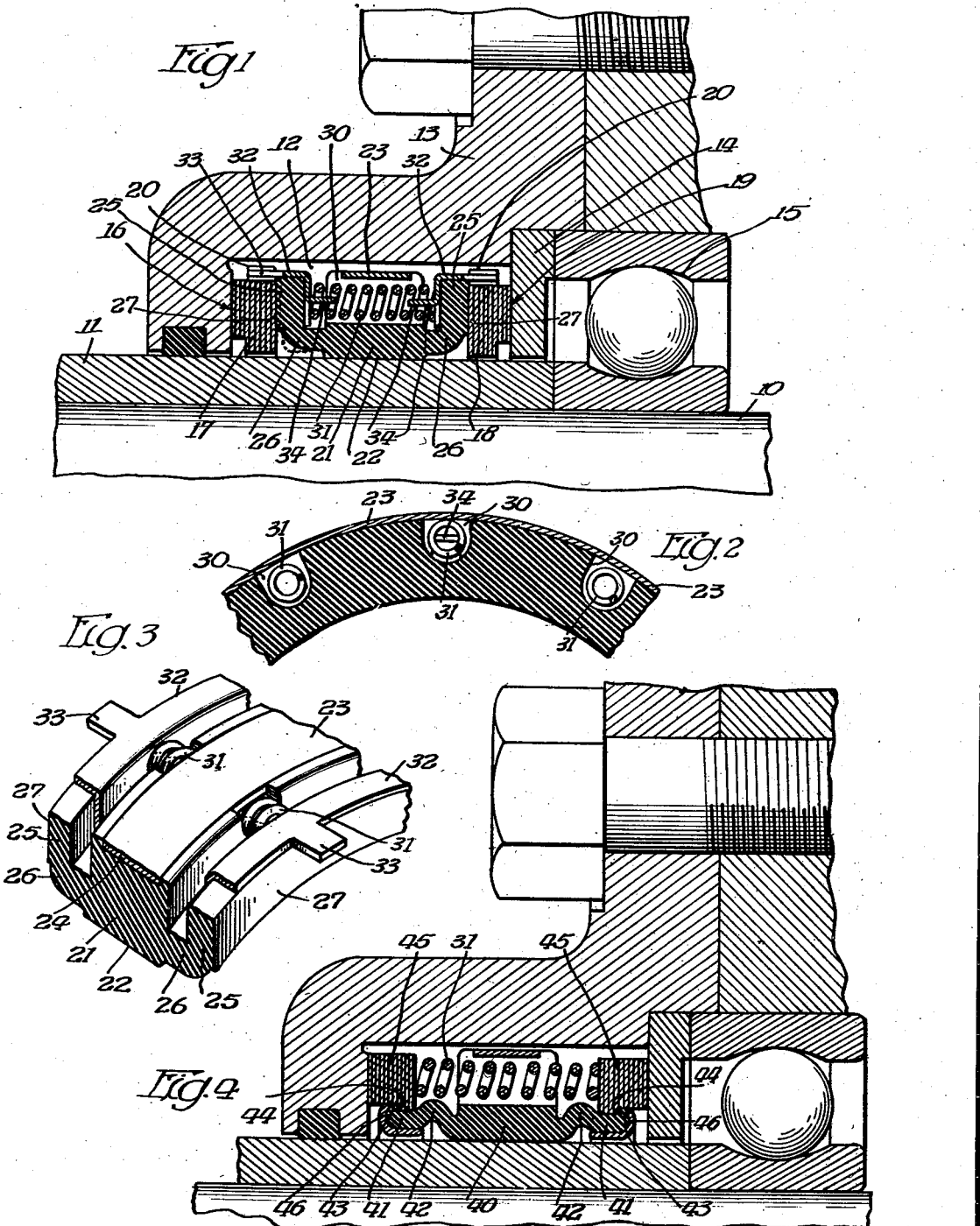
Inventor:
Albert J. Matter
By Kent W. Wonnell
Attys Patented Aug. 28, 1945

2,383,667

UNITED STATES PATENT OFFICE 2,383,667

FLUID SEAL

Albert J. Matter, Park Ridge, Ill., assignor to Crane Packing Company, Chicago, Ill., a corporation of Illinois Application July 27, 1942, Serial No. 452,475

8 Claims. (Cl. 286—11)

This invention relates in general to a fluid seal of the rotary shaft type and is more particularly described as a preloaded tank seal in which the sealing member has an inner peripheral driving and sealing contact and provides a lateral seal at each side thereof at right angles to the peripheral seal.

An important object of the invention is to provide a seal of this type in which the central and lateral portions of the seal are retained in place and resiliently held in sealing engagement with their driving and contact suraces.

A further object of the invention is to provide retaining rings for the sealing member and its flanges for holding them in sealing engagement without interfering with the flexing action of the flanges to allow limited axial movement of the flanges.

A further object of the invention is to insure driving engagement between the flanges of the sealing member and the sealing discs ordinarily rotatable and engaged thereby.

Other objects of the invention will appear in the specification and will be apparent from the accompanying drawing in which, Fig. 1 is a fragmentary sectional view showing a part of a seal in accordance with this invention;

Fig. 2 is a partal sectonal vew as taken through the center and transversely of Fig. 1;

Fig. 3 is a fragmentary perspective showing the seal of Fig. 1 and its retaining rings; and Fig. 4 is a view similar to Fig. 1 showing a modified form.

For certain sealing requirements, it is desirable to insure not only that the sealing member is more firmly in preloaded or sealing engagement upon a shaft, but also that a double lateral seal is provided for sealing surfaces at right angles to the peripheral driving seal. A further difficulty of this requirement is to insure axial movement of each lateral seal separately with respect to the central sealing portion and also with respect to the other lateral seal in order to permit the necessary axial spacing movement of the seal along or longitudinally of the shaft. The present invention overcomes these objections by providing lateral flange sealing portions connected to the main sealing ring by flexible necks each of which will yield separately to allow flexing or displacement of the outer portion of the flange without affecting any of the sealing surfaces.

Referring now more particularly to the drawings, the invention is described as applied directly to a shaft 10 or a sleeve 11 tightly mounted on the shaft with a sealing space 12 enclosed by a housing member 13 and a fixed bearing ring 14 abutting a bearing 15.

In the bearing space, the end surface 16 is ground or honed to make fluid-tight contact with a sealing washer 17 and at the other end, a sealing washer 18 makes a similar sealing engagement with a sealing surface 19 on the ring 14.

These washers 17 and 18 make fluid-tight engagement with the surfaces and are rotatable with the seal by means of slots in driving projections 20 at the outer peripheries thereof.

A ring shaped sealing member 21 of resilient elastic material such as rubber or a rubber substitute is sized so that the inner peripheral surface 22 fits tightly upon or is preloaded by a shaft or other surface to which it is applied to insure a driving and sealing fitting therewith. The central portion with the surface 22 is thick and therefore substantially rigid axially. A retaining ring 23 is mounted in a shallow recess 24 in the outer periphery to assist in holding the sealing ring in place.

Extending laterally from the sides of the rings 21 adjacent the inner periphery thereof, are lateral flanges 25 connected integrally therewith by reduced necks 26 so that each outer flange will have a flexible and displaceable movement with respect to the central ring portion without distorting the outer flange. In the form shown by Figs. 1 and 3, the flange 25 extends upwardly with an outer contact and sealing surface 27 adapted to engage one of the sealing washers 17 or 18.

In the outer periphery of the central ring portion are a number of spaced recesses 30 covered at the top by the retaining ring 23, but open at the sides for receiving transverse coil springs 31 projecting therefrom and against the inner edges of the flanges 25. Instead of contacting directly with the flanges, retaining rings 32, angular in cross-section, are inserted against the inner side and periphery of each flange, the end of each spring 31 engaging the inner side web of the ring and thereby tending to press the outer contact surface 27 of the flange outwardly as permitted by the flexible neck 26 without distortion of the outer contact surface. Each ring 32 is provided at intervals with a projection 33 adapted to engage in corresponding notched projections 20 of the adjacent sealing washer 17 or 18. Extending inwardly from each ring 32 are projections 34 corresponding to the springs 31 and the openings 30 adapted to engage in the outer ends of the springs and to hold them centered in the recesses 30 of the sealing member.

In the form of the invention shown by Fig. 4, the central resilient sealing ring member 40 has projecting lateral flanges 41 connected thereto by flexible neck portions 42 which may be of a reduced or bellows type to allow free and independent flexing of each flange. The end of each flange has an inner angular hook engaging portion 43 which makes a sealing and driving contact with a corresponding shoulder 44 at the inner periphery of a sealing washer 45 disposed in line with the spring openings 30 at the periphery of the ring member as shown in the other form of the invention. In this case, the retaining rings are not necessary as the springs 31 directly engage the inner surfaces of the frictional sealing washers pressing them outwardly into sealing engagement. In order to hold the hook extremities in engagement with the sealing washers, a curved eyelet or sealing ring 46 is applied to the inner inside and outer edge of the flange holding it in engagement with the washer.

This construction needs no other driving engagement between the sealing member and the washers 45, but they are rotated with the central sealing member.

With these constructions, the central flexible sealing ring has a driving and sealing connection with the shaft at its inner periphery and the flexible lateral flanges are held resiliently in engagement with the sealing washers. The driving engagement and connection between the flanges and the washers is such that they are rotated together with the central seal as a sealing unit making a double fluid seal between the washers and the sealing surfaces which they contact. In both forms, each flange is firmly held against its washer to make a liquid seal therewith and each flange is separately movable with respect to the central ring seal without distorting its contact or sealing surfaces, and both flanges are held in place by the same transverse sealing springs.

I claim:

1. A fluid seal comprising a central ring member of elastic resilient material having its inner periphery for preloading engagement with a shaft, a lateral sealing means at the sides of the ring portion to provide a seal at right angles to the periphery, a flexible resilient neck connecting the lateral sealing means and the central ring portion, and springs extending through the central ring portion at intervals and engaging and tending to separate the lateral sealing means.

2. A fluid seal comprising a central ring portion of elastic resilient material for preloading engagement at its inner periphery with a shaft and ring means at its outer periphery for maintaining such preloading engagement, lateral sealing engagement means having a flexible neck connecting them with the ring portion below the outer periphery thereof spaced recesses in the outer periphery of the ring portion below the ring means, and transverse springs extending through the recesses and engaging the lateral sealing means at the extremities thereof.

3. In a fluid seal, a central ring member of rubber-like material sized for preloading engagement with a shaft at its inner periphery and having spaced recesses in its outer periphery with lateral sealing means projecting therefrom below the said recesses, the lateral sealing means including portions in line with the outer recesses and having deflectible reduced connection portions integral with the ring to permit limited axial variation of the lateral sealing means.

4. In a fluid seal, a central ring portion of rubber-like material, sized for preloading engagement with a shaft at its inner periphery, having spaced recesses in its outer periphery and opposite integral lateral sealing means extending from the ring portion below the recesses and projecting at the sides thereof in line with the recesses, the outer projecting portions being connected by a resilient deflectible neck, and springs extending through the recesses and the opposite ends engaging the insides of the lateral projections for pressing them outwardly into lateral sealing engagement.

5. A fluid seal structure in accordance with claim 4, in which angular rings are inserted at the inner and peripheral edges of the said lateral extensions having projections spaced to correspond with the recesses in the periphery, said projections extending into the ends of and centering the springs inserted through the recesses and also maintaining said rings against rotation relative to said central portion.

6. A fluid seal structure in accordance with claim 4 in which a spring ring extends around the outer periphery of the rubber-like ring member for maintaining the inner periphery in preloading engagement with respect to a shaft and also for retaining the transversely extending springs in the outer peripheral recesses.

7. A fluid seal comprising a central ring portion of rubber-like material having integral lateral projections each with an intermediate deflectible connecting neck portion and outer flanges with inner seal engaging surfaces, the outer periphery of the ring portion having transverse recesses and springs located in the recesses, and sealing members engaged by the said inner seal engaging surfaces of the sealing member to hold the inner faces thereof against the ends of the said transverse springs.

8. An annular fluid sealing device comprising a thick central portion which is substantially rigid axially, flexible connecting portions extending from the end regions of said central portion, said connecting portions being thinner than the central portion, the outer ends of the connecting portions being spaced axially from the ends of the central portion and each connecting portion in radial cross-section having an angular bend between the ends thereof to accommodate relative axial movement therebetween, and flanges projecting radially outwardly from the end regions of the connecting portions, said flanges being thicker than the connecting portions and having substantially parallel inner faces for the interposition of a spring, substantially all of the flexing of the device incident to axial movement of the flanges toward and away from each other being confined to the thinner connecting portions thereof.

ALBERT J. MATTER.